United States Patent [19]

Page, Jr.

[11] 3,909,519

[45] Sept. 30, 1975

[54] MEASURING SYSTEM

[76] Inventor: Lewis C. Page, Jr., 2630 Northaven, Suite 108, Dallas, Tex. 75229

[22] Filed: Nov. 10, 1972

[21] Appl. No.: 305,499

[52] U.S. Cl. ............................ 178/6.8; 178/DIG. 36

[51] Int. Cl.² ............................................ H04N 7/18

[58] Field of Search ........................ 178/DIG. 36, 6.8

[56] References Cited

UNITED STATES PATENTS

| | | | |
|---|---|---|---|
| 3,081,379 | 3/1963 | Lemelson | 178/6 |
| 3,578,906 | 5/1971 | Holmstrom et al. | 178/6 |
| 3,678,192 | 7/1972 | Akuta et al. | 178/7.83 |

*Primary Examiner*—Howard W. Britton
*Assistant Examiner*—Michael A. Masinick
*Attorney, Agent, or Firm*—Murray Robinson; Ned L. Conley; David Alan Rose

[57] ABSTRACT

A measuring system employs a television camera tube viewing the object to be measured, television transmission circuit conveying the camera signals to a television picture tube monitor on which appears an image of the object to be measured, and adjustable means for producing one or more reference lines on the picture tube. The reference lines are adjusted to lie at the extremities of the distance to be measured and the difference between the adjustment positions of the reference lines is proportional to the distance being measured.

Each horizontal reference line is produced by modulating (light or dark) all or a large portion of the length of a selected horizontal trace of the picture tube raster. Each vertical reference line is produced by spot modulating (light or dark) a selected point in each horizontal trace of the picture tube raster, the spots being aligned vertically.

27 Claims, 10 Drawing Figures

MEASURING SYSTEM

According to the invention in a standard 2:1 interlace system each horizontal trace to be modulated for production of a horizontal reference line is selected by presetting a binary counter with a number derived from a shaft encoder and at the beginning of the appropriate field of each frame supplying a stream of pulses to the counter at twice the line frequency rate. The counter counts until it recycles, which supplies a line modulating pulse to the picture tube. Alternatively, a pair of counters counting horizontal sync pulses can start from zero and their combined output compared with the shaft encoder output, a line modulating pulse being produced whenever a match is obtained.

According to the invention the position of each modulating spot required for production of a vertical reference line is determined by presetting a binary counter with a number from a shaft encoder and at the beginning of each line supplying pulses from a suitable source to the counter until it recycles, which supplies a spot modulating pulse to the picture tube. A suitable source is an oscillator having a frequency that is a high multiple of the line frequency.

Further in accordance with the invention, to eliminate the effect of non-linearity, scale markings on the first line of the camera tube can be swept by the electron beam of the camera tube to produce pulses the sum of whose number is proportional to the distance swepted along a horizontal line since the summing began rather than to time and such pulses counted in an auxiliary or "first line" counter whose count is compared to the shaft encoder output, a match effecting storage of the corresponding or corrected count of oscillator pulses in a storage register. The contents of the counter which counts the number of oscillator pulses occurring during each trace is compared with this register's count rather than that from the shaft encoder.

Instead of producing a spot modulating pulse when the counter recycles, the counter can be started from zero and a pulse produced when its count matches that of a shaft encoder.

According to one feature of the invention, a single shaft encoder is used for all reference lines, both lines in each pair of horizontal and vertical lines, by providing storage register and switching means. In a first or move mode of operation the shaft encoder controls the position of an initial reference line. In a second or set mode of operation the initial reference line remains where it was previously positioned, being under the control of a storage register, and the second or comparison reference line is positioned by the shaft encoder. Digital displays show the difference in position of the two reference lines. Scaling means adjust the digital displays to read in conventional units and compensate for variation in adjustment of the optical magnification means used in conjunction with the camera tube.

BACKGROUND OF THE INVENTION a. Field of the Invention

This invention pertains to measuring apparatus and more particularly to apparatus for measuring the linear dimensions of an object viewed with closed circuit television. Otherwise considered, the invention may be said to pertain to the measurement of the size of an image appearing on a kinescope.

b. Description of the Prior Art

It is known to use a television camera alone to measure the linear dimensisons of an object without touching the object. Examples of such apparatus are disclosed in the following United States patents:

| | |
|---|---|
| 2,674,915 | Anderson |
| 3,222,979 | Webster |
| 3,449,511 | Hecker |
| 3,579,249 | Dewey et al |
| 3,619,499 | Petrocelli |
| 3,621,130 | Paine |

In the apparatus disclosed by the Anderson and Webster patents, it appears that the object to be measured is intended to be of fairly uniform shade contrasting with the background whereby the scanning beam of the camera tube produces a continuous pulse having a width proportional to the width of the object scanned. Anderson measures the width of such a pulse by gating an oscillator with the pulse and counting the cycles of the oscillator. Webster measures the width of such a pulse by providing lines scribed on the camera tube to interrupt the pulse and counting the number of interruptions.

In a somewhat similar fashion the Dewey apparatus employs a camera tube to scan an image of a specimen and count features thereof having a specified grey level and size, the size being indicated by pulse width as the tube beam passes over the feature. Pulse width discriminators sort features above and below the specified size, but definite size is not determined.

In the apparatus disclosed by the Petrocelli and Paine patents the distance measured is that from an edge of the camera to a point on the object, the distance being determined by a clock measuring the time for the cathode ray to move from the start of a line to intersection with the object. In the Petrocelli construction the object is a single spot whose position relative to the camera is to be determined. In the Paine construction the object has area and the position of its edge nearest a reference line on the camera is measured.

It is also known to use a complete closed circuit television system, including both camera tube and picture tube or kinescope, to measure a linear dimension of an object, as shown by the following patents and publications:

U.S. Pat. to Rosin et al — No. 3,261,967.

U.S. Pat. to Hecker — No. 3,449,511.

"Measurements With Closed Circuit Television" by Bojman in the IBM Technical Disclosure Bulletin (TDM), Vol. 12, No. 1, June, 1969, page 24.

"Measuring With Closed Circuit Television" by Bojman in the IBM Technical Disclosure Bulletin (TDM), Vol. 13, No. 8, January, 1971, page 2145.

In the Rosin et al apparatus the camera tube is mounted for oscillation about an axis. The picture tube is provided with a reference line. The camera is pointed so that the image of a desired point on the object to be measured, e.g. an edge, shows up in the picture tube in register with the reference line. The camera is then turned until the image of another desired point on the object to be measured, e.g. another edge, shows up in the picture tube in register with the reference line. The tangent of the angle of rotation through which the camera has moved is a measure of the distance between the points. Such measure is converted to a digital display by a pulse encoder driven by the shaft on which the camera turns.

In the Hecker patent it is indicated that the horizontal and vertical distances between two "points" A and B on a television picture tube is measured by counting oscillations from two oscillators occurring during the period between pulses corresponding to the two points A and B. It appears that the pulses corresponding to points A and B must be the beam pulses which produce the image points A and B on the picture tube and originate in a camera tube or some other scanning system. The image on the picture tube does not itself enter into the measurement in the Hecker apparatus.

The first Bojman article discloses a closed circuit television measuring the system in which one or more horizontal and vertical lines are produced on the picture tube at adjustable positions. To make a measurement, e.g. in the horizontal direction, the vertical line on the picture tube is positioned in register with the edge or other selected point on the image of the object to be measured, and the position of the line adjustment control is noted. The same or another line is then moved to register with the other edge or selected point on the image of the object being viewed by the camera tube and the position of the control adjustment is noted. The difference between the two positions of adjustment of the line control or controls is a measure of the distance between the two edges or selected points. The vertical line is generated by producing a contrasting spot in each horizontal trace of the cathode ray at the same distance from the beginning of the trace. This is accomplished by generating a linear voltage ramp at the beginning of each beam sweep, initiated by the horizontal sync pulse, and comparing the ramp voltage with an adjustable dc voltage. When the ramp and dc voltage are equal, the spot pulse is generated. Position of the vertical line comprising the spots is measured by the magnitude of the adjustable dc voltage. If there is any non-linearity in the ramp or dc voltage adjustment, error is introduced into the measurement. The horizontal line is generated, apparantly, by applying a beam modulator pulse to a particular sweep of the picture tube beam, the position of the line being determined by comparing the output of an adjustable dc voltage with the voltage of a linear ramp pulse initiated by the vertical sync pulse. Measurement of vertical distance is effected by moving the horizontal line from a position of registry with one feature of the image being measured to a position of registry with another feature and noting the difference between the corresponding voltage adjustments of the dc voltage. Greater accuracy of vertical measurements can be effected by counting horizontal sync pulses to effect initiation of the horizontal line sweep, the difference between counts for different positions of the horizontal line being a measure of the vertical dimension of the actual object viewed by the camera tube as distinct from the dimensions of the image on the picture tube, the later differing from the object dimension if there is any non-linearity in the vertical sweep. No arrangement for eliminating the effects of non-linearity in the measurement of horizontal dimensions is disclosed.

The second Bojman publication discloses a closed circuit television measuring system employing two camera tubes and one picture tube fed from both cameras. One camera is directed at the object to be measured and another at a graduated rod or scale. A pair of adjustable horizontal lines is provided in the picture tube as in the apparatus of the earlier Bojman article. The image of the scale is used for gross measurements and the adjustable lines are used to measure between graduations of the scale image. A digitalized output from the adjustable line controls is added to the scale marking to produce a position measurement.

SUMMARY OF THE INVENTION a. Known Closed CIrcuit TV Measuring System

The present invention concerns improvements in the already known apparatus for measuring linear dimensions of an object which known apparatus comprises a closed circuit television system wherein a camera tube is used to view the object to be measured, a picture tube is used to display images of the object to be measured and the reference lines, and gage means for generating reference lines on the picture tube, each of one or more horizontal reference lines being generated by positively or negatively modulating the beam strength during the period of one or more horizontal sweeps, the positions of the horizontal reference lines being determined by counting clock pulses of appropriate rate commencing at the start of each field and continuing until the desired count is reached, each of one or more vertical reference lines being generated on the picture tube by positively or negatively modulating the beam strength at one point or spot in each horizontal sweep to produce a series of spots, the distance of each spot from the vertical edge of the frame being the same and selected at the desired distance.

b. Shaft Encoder

According to the invention the gage means includes a shaft encoder whose output determines the count to be made of pulses from a pulse stream generator from the beginning of a frame to the time the picture tube beam is modulated to produce a reference mark, e.g. a line or spot.

c. Horizontal and Vertical Modes of Operation

A single shaft encoder is used for controlling both horizontal and vertical reference lines, storage register means being provided for both the horizontal and vertical portion of the gage means whereby to store selected outputs from the encoder, and horizontalvertical switch means being provided to connect the encoder to one or the other of the horizontal or vertical portions of the gage means.

d. Move and Set Modes of Operation

In somewhat similar fashion, the single encoder is used to separately control the positions of both lines in each pair of reference lines horizontal or vertical. In a first or "Move" mode of the apparatus a first or initial reference line, horizontal or vertical, is positioned under the control of the shaft encoder and one of two "zero point" storage registers, horizontal or vertical, holds the position of the initial line when thereafter the apparatus is switched to a second or "Set" mode of operation in which a second or comparison reference line parallel to the initial line is positioned under the control of the shaft encoder. Two digital display means, horizontal and vertical, directly indicate the differences between the positions of the initial and comparison horizontal reference lines and between the positions of the initial and comparison vertical reference lines.

e. Counter Positioned Horizontal Reference Line With Interlaced Scanning

Further in accordance with the invention, there is provision for interlaced scanning, e.g. 2:1 or standard interlace, the time for line modulating the picture tube to produce a horizontal reference line being selected by presetting a binary counter with a number, odd or even, derived from the shaft encoder, and at the beginning, as determined by synchronizer means, of each corresponding field, odd or even, as determined by the least significant bit in the counter, supplying pulses to the counter from a high frequency clock operating at twice the horizontal sync pulse rate. The counter counts until it recycles, which supplies a line modulating pulse to the picture tube. Alternatively, horizontal sync pulses for both add and even lines may be counted in separate counters, counting by twos, odd or even, starting from zero and the counter outputs combined to determine a match with the shaft encoder output, a line modulating pulse being produced whenever a match is obtained.

f. Counter Positioned Vertical Reference Line

Also in accordance with the invention the time for spot-modulating each horizontal trace to produce a vertical reference line is selected by presetting a binary counter with a number from a shaft encoder and at the beginning of each trace supplying to the counter pulses from a suitable regular source until it recycles, which supplies a spot modulating pulse to the picture tube beam. A suitable source is an oscillator having a frequency that is a high multiple of the line frequency. Instead of producing a spot modulating pulse when the counter recycles, the counter can be started from zero and a pulse produced when its count matches that of the shaft encoder.

g. Horizontal Distance Correction

To eliminate the effect of non-linearity of the horizontal drive compared to time, scale markings on the first line of the camera tube can be swept to produce pulses whose number is proportional to distance rather than time and such pulses can be compared to the oscillator pulses to correct for such effects. Instead of feeding the shaft encoder output to the vertical storage register, the distance proportioned pulses are counted in an auxiliary or "first line" counter whose count is compared to the shaft encoder output, a match effecting storage of the corresponding or "corrected" count of oscillator (time proportional) pulses in the vertical storage rejust.

h. Scaled Digital Display

A further feature of the invention is the provision of visual digital displays directly indicating the distance to be measured, horizontal or vertical, in conventional units. Scaling means are provided for enabling the digital display inputs to be adjusted to compensate for variation in the magnification produced by the lens system associated with the camera tube.

BRIEF DESCRIPTION OF THE DRAWINGS

For a detailed description of the invention reference will now be made to the accompanying drawings wherein.

DESCRIPTION OF PREFERRED EMBODIMENTS

Figure 1A:
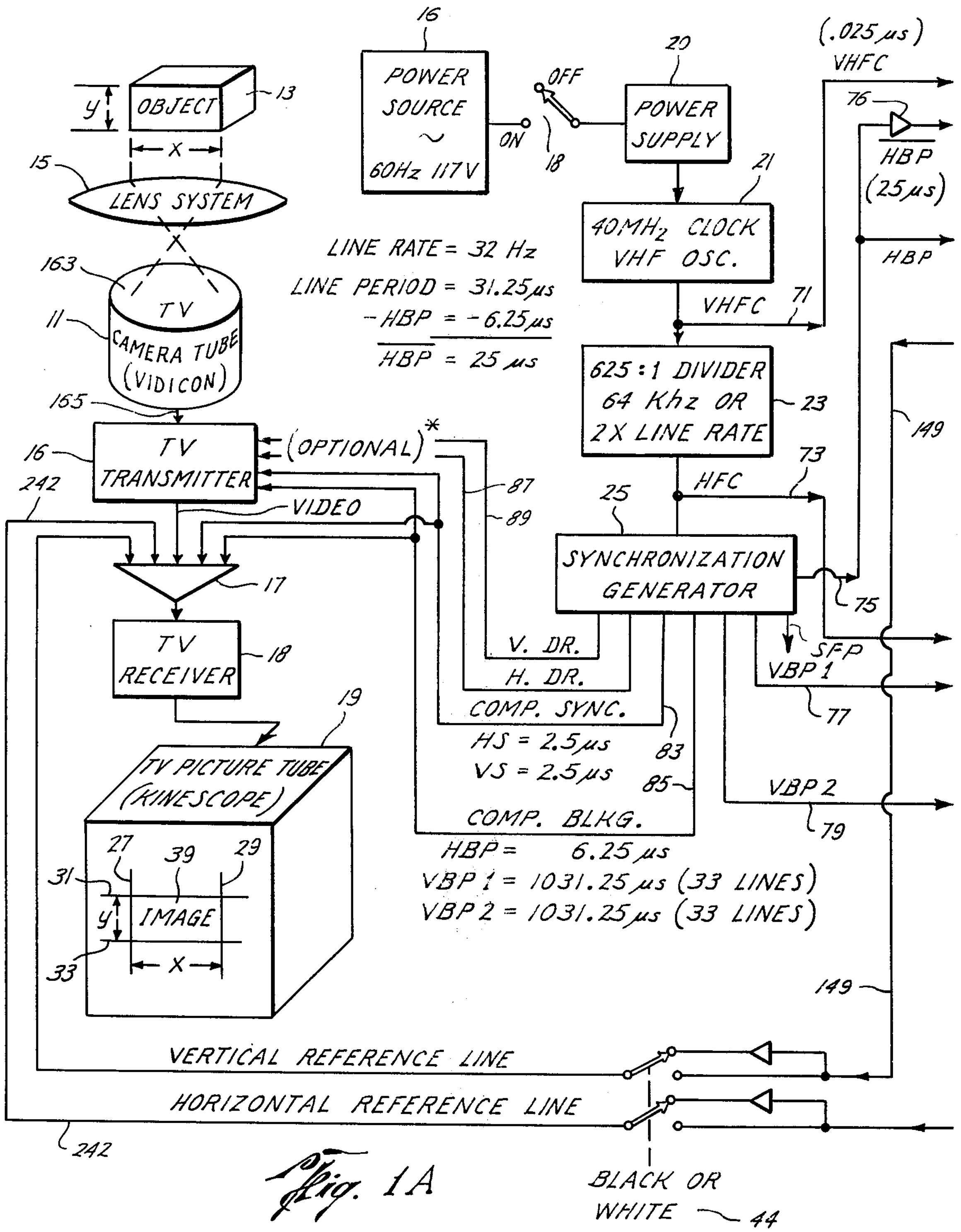
FIGS. 1A, 1B, 1C together form a schematic and logic diagram of measuring apparatus according to the invention.
Figure 1B:
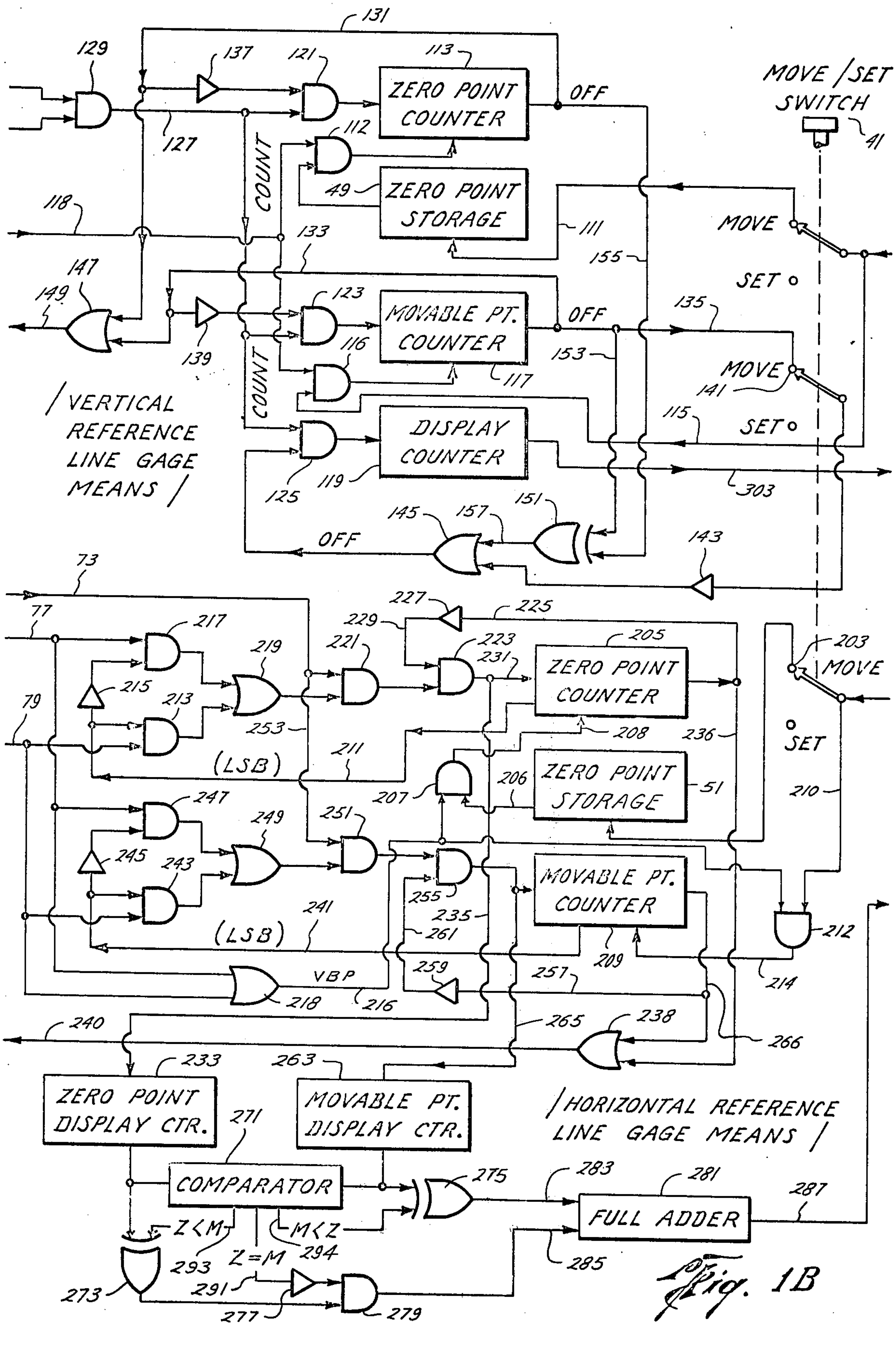
Figure 1C:
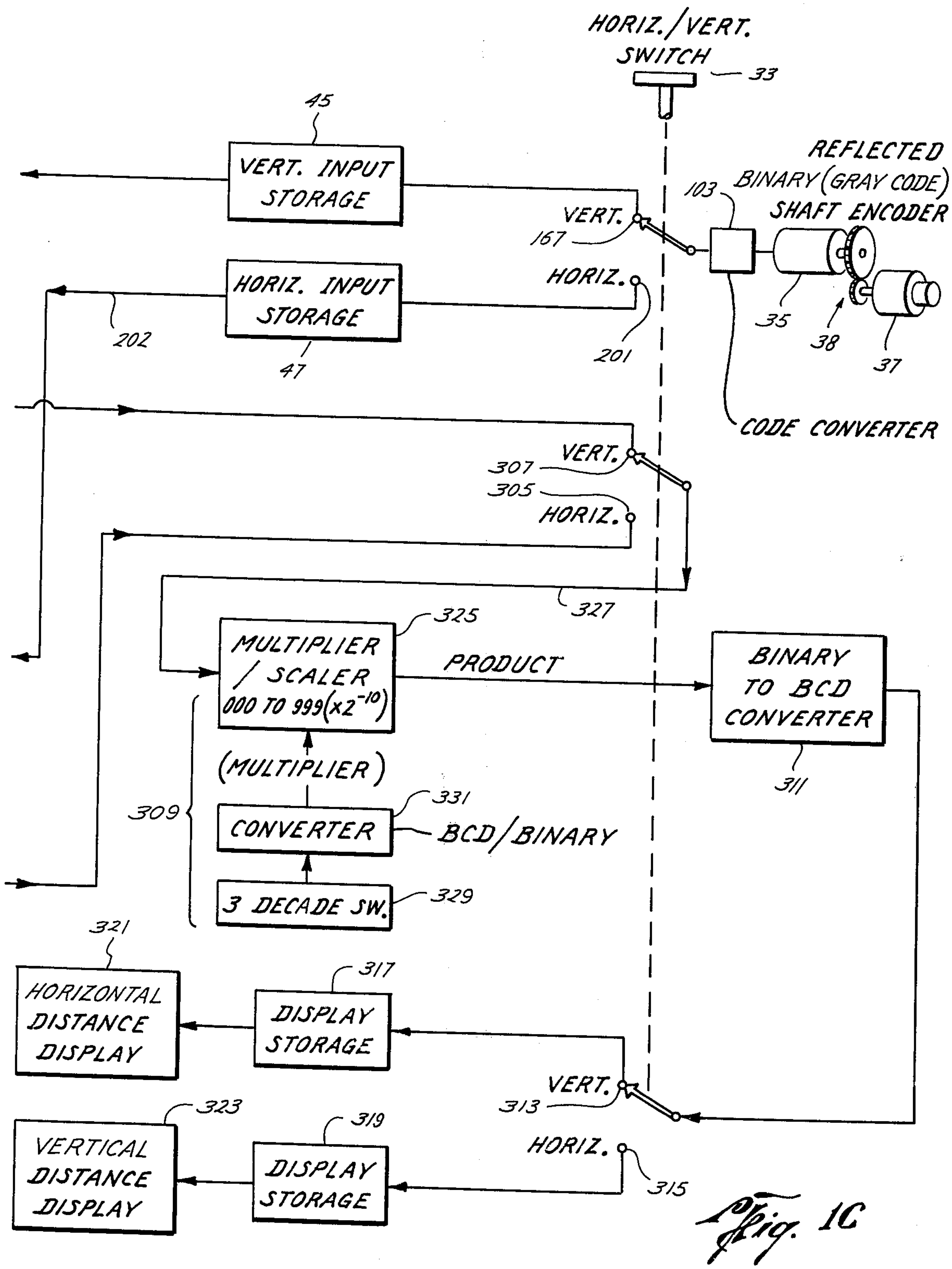

Referring now to FIGS. 1A, 1B and 1C, and initially more particularly to FIG. 1A, there is shown a measuring apparatus comprising a conventional closed circuit television camera tube 11 viewing an object 13 to be measured, an image of the object being formed on the face of the camera tube 11 by lens means 15. Camera tube 11 is connected to television transmitter 16. The video output of the transmitter 16 is combined with horizontal and vertical reference line producing pulses in amplifier mixer 17 whose output is fed to conventional closed circuit television receiver 18 to which is connected picture tube or monitor 19.

Picture tube 19 is supplied with beam deflection voltages from a local oscillator in receiver 18, but camera tube 11 may receive beam deflection voltages from a synchronization generator 25 which also furnishes blanking and synchronizing pulses to the transmitter 16 and, through mixer 17, to receiver 18. The several outputs of synchronization generator 25 are derived ultimately from a very high frequency (e.g. 40 Mhz.) clock (VHFC) 21 adapted also to supply pulses to be counted to measure horizontal distances. A 625 to 1 digital divider 23 reduces the frequency to twice the line frequency rate as required to supply pulses to be counted to measure vertical distances. The divider output is also fed to synchronization generator 25 which also produces pulses for controlling the pulse counter in the distance measurement portions of the operation.

The vertical reference lines 27, 29 on the picture tube screen are produced by spot modulating each horizontal line of the picture tube with the spots all occurring at equal distances from the start of each line. Referring now to FIGS. 1C and 1B, this is accomplished by placing horizonal-vertical switch 33 in the elevated position shown. Shaft encoder 35 is rotated manually by means of knob 37 and 8:1 reduction gear 38 to position the vertical reference lines 27, 29 in register with selected points on the image 39 on the monitor screen. The positions of the two reference lines are fixed successively. First, with move-set switch 41 in the MOVE or uppermost position as shown, the position of reference line 27 is determined by turning the shaft encoder, then with switch 41 in the opposite or SET position, the position of reference line 29 is determined by turning the shaft encoder. Reference line 29 may be positioned to either the right or left of reference line 27. The desired positioning of the horizontal reference lines 31, 33 is effected by putting horizontal-vertical switch in the lowered position opposite to that shown. With move-set switch 41 in the MOVE or uppermost position shown, the position of reference line 31 is determined by turning the shaft encoder until the line is in the desired position; then with the move-set switch in the SET or lowermost position opposite to that shown, the shaft encoder is turned until the reference line 33 is in the desired position, which may be either above or below that of reference line 31.

The nature of the reference lines, light or dark, is determined by placing black or white switch 44 in the desired positions.

The position of each reference line is maintained during the subsequent positioning of other lines by storing the corresponding shaft encoder outputs in four storage registers 45, 47, 49, 51.

Registers 49 and 51 are "zero point" registers. Register 49 stores the shaft encoder output when horizontal-vertical switch 33 is in the up or vertical reference line control position and move-set switch 41 is in the MOVE position. At this time register 45 will have the same count as register 49. When move-set switch 41 is placed in the SET position, register 49 holds its count but register 45 picks up the new count as determined by the new position to whch shaft encoder 35 is turned in positioning vertical reference line 29. When horizontal-vertical switch 33 is moved to the down or horizontal reference line control position the stored contents of, registers 45 and 49 remain constant.

Register 51 stores the shaft encoder output when switch 33 is in the down or horizontal reference line control position and move-set switch 43 is in the MOVE position. At this time register 47 will have the same count as register 51. When move-set switch 43 is placed in the SET position, register 51 holds its count but the contents of register 47 will change to a new count as determined by the new position to which shaft encoder 35 is turned in positioning horizontal reference line 33. When horizontal-vertical switch 33 is moved to the up or vertical position, registers 47 and 51 hold their positions.

Referring now to FIG. 1A, a suitable electrical power supply 16, e.g. 117 volt, 60 Hertz alternating current, is connected to the apparatus by closing switch 18. This energizes power supply 20 which activates crystal controlled oscillator or very high frequency clock (VHFC) 21.

Clock 21 preferably has an output frequency of 40 megahertz which corresponds to a period of 0.025 microseconds. The clock period is one-thousandths of the active time of 25 microseconds for each horizontal trace of the closed circuit television system and by counting the clock output pulses the horizontal distance across the television screen is divided into one thousand units.

The output (VHFC) of clock 21 is supplied via path 71 to a vertical reference line counting circuit later to be described in detail. It is also supplied to frequency divider 23, which preferably has a 625 to one ratio producing a high frequency clock (HFC) output having a frequency of 64 kilohertz, which is twice the line rate frequency of 32 kilohertz, the latter corresponding to a line period of 31.25 microseconds. Allowing 6.25 microseconds for horizontal blanking, there is left 25 microseconds for the active time of each horizontal trace.

The output (HFC) of the 64 kilohertz high frequency clock (frequency divider) 23 is supplied to a horizontal reference line counting circuit later to be described in detail. Since HFC frequency is twice the line rate, there are as many HFC pulses during each field, in a standard 2:1 interlace system, as there are lines in each frame.

The output of clock 23 is also supplied via path 73 to synchronization generator 25, which produces a plurality of outputs as follows:

Output 75 (HBP) provides pulse output during the period of each horizontal blanking pulse, and after inversion of 76 provides a long pulse output ($\overline{\text{HBP}}$) during the active period of each horizontal trace when there is no horizontal blanking pulse.

Output 77 (VPP1) provides pulse output during the period of each vertical blanking pulse for field Number one.

Output 79 (VBP2) provides pulse output during the period of each vertical blanking pulse for field number two.

Figure 3:
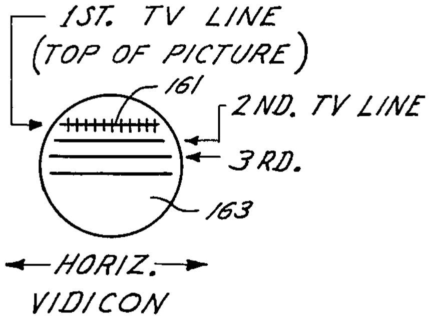
FIGS. 3 and 4 are diagrams showing a modified form of the invention.
Figure 5:
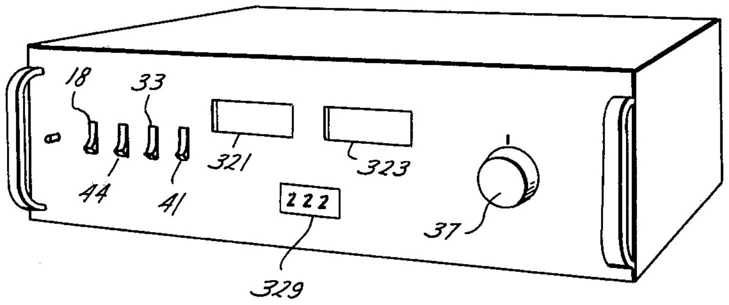
FIG. 5 is a perspective of a measurement unit in accordance with the invention.
Figure 4:
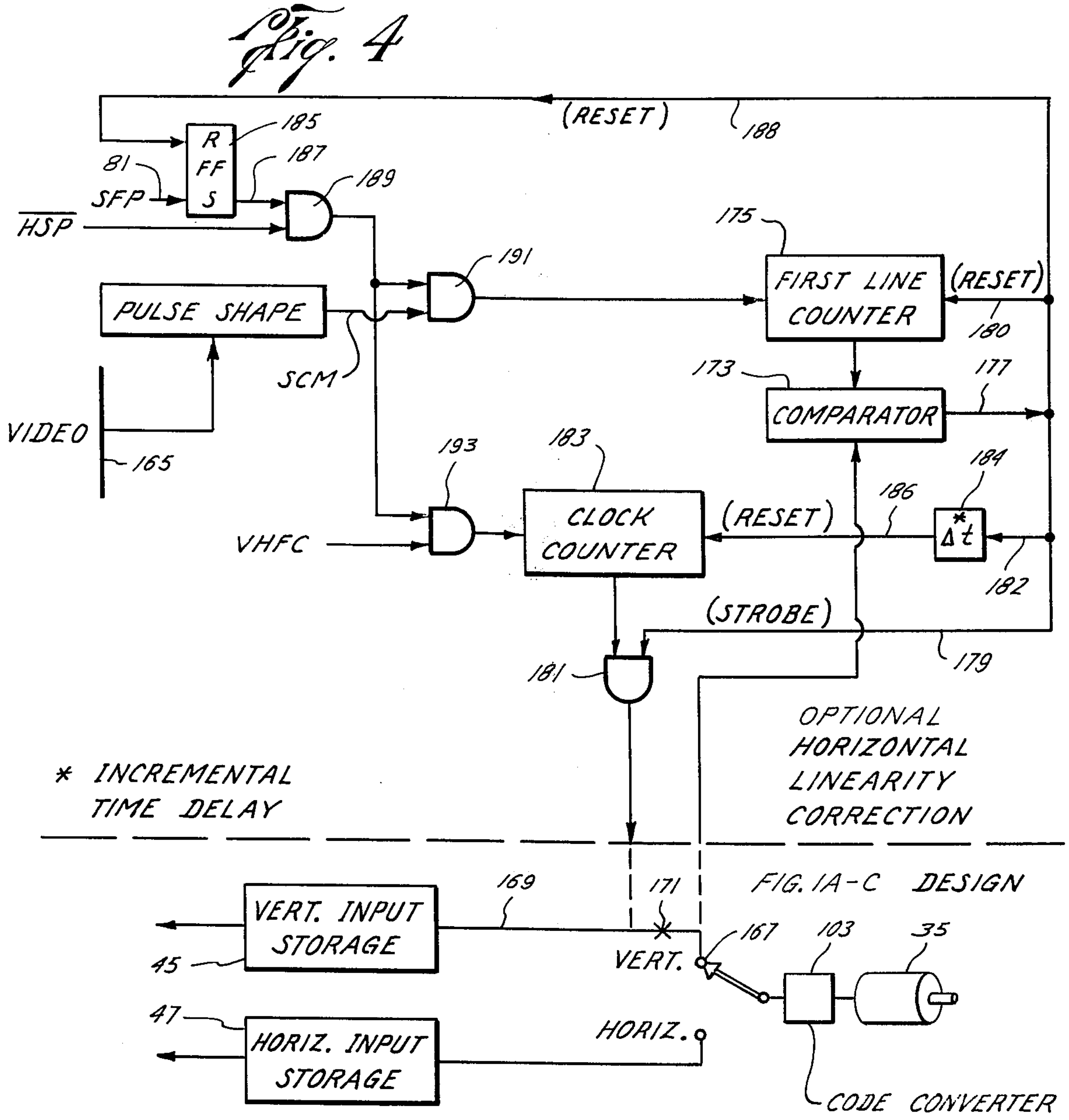

Start frame pulses are generated within synchronization generator 25 to initiate the sequence of outputs 77, 79 and are available also at output 81 if the linearity corrector of FIGS. 3 and 4 is used.

Output 83 provides composite horizontal and vertical sync pulses to the closed circuit television transmitter.

Output 85 provides composite horizontal and vertical blanking pulses to the closed circuit television transmitter.

Outputs 87 and 89 provide horizontal and vertical drive pulses for the transmitter, although such pulses may be generated internally in the transmitter if desired.

Outputs 83 and 85 mix with the video signal from transmitter 16 in mixer 17. The resultant composite video and horizontal and vertical blanking and synchronizing signal has the waveform shown in FIG. 2.

Figure 2:
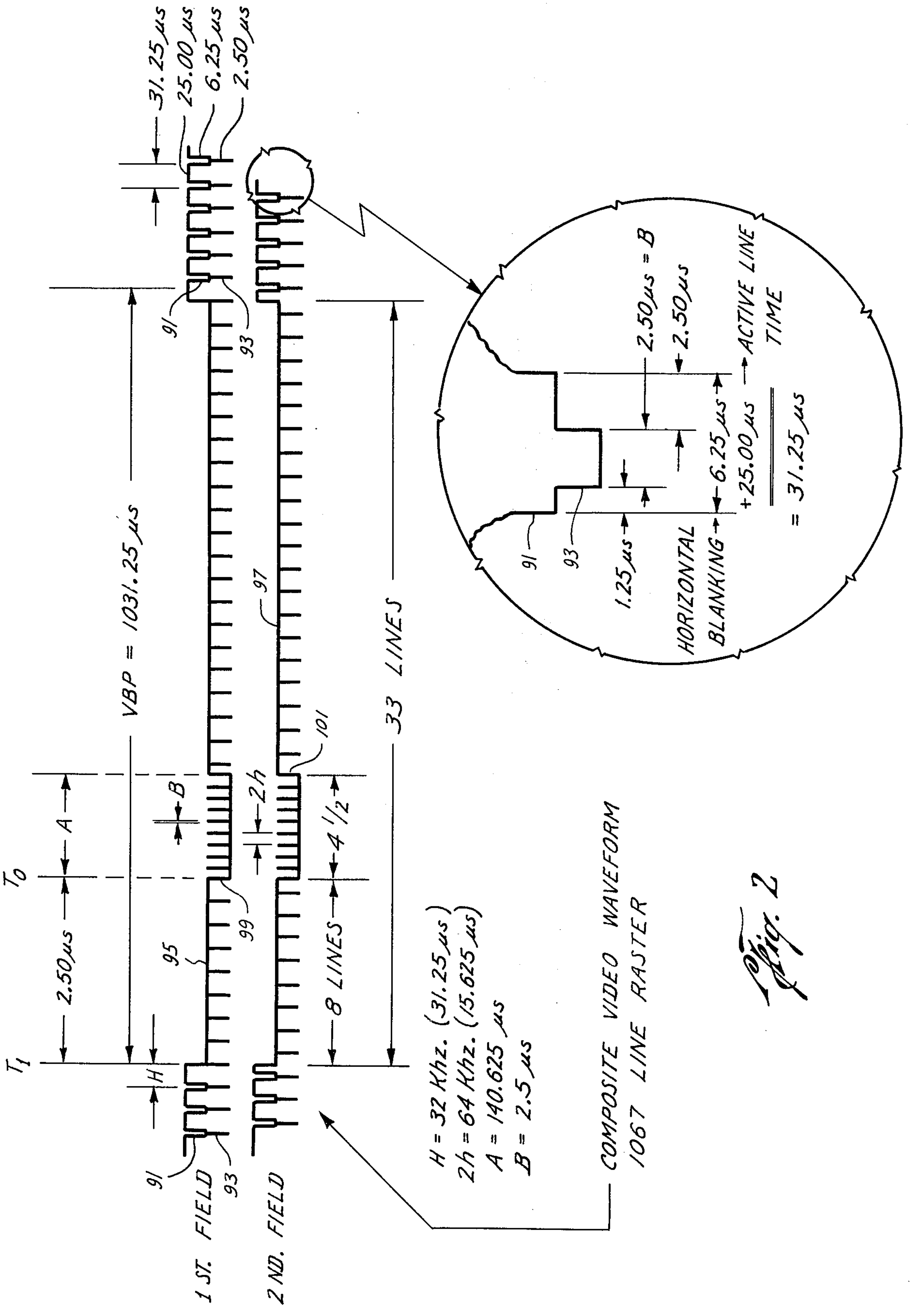
FIG. 2 is a representation of the composite video waveform supplied by the synchronization generator of FIG. 1A.

Referring to FIG. 2, the horizontal blanking pulses 91 each have a duration of 6.25 microseconds. On each horizontal blanking pulse is superimposed a horizontal sync pulse 93 of 2.6 microseconds duration. Vertical blanking pulses 95, 97 each have a duration of 1031.25 microseconds with vertical synchronizing pulses 99, 101 superimposed thereon. It is to be understood that the train of pulses marked "2nd field" in which appears vertical blanking pulse 97 follows the train of pulse marked "1st Field" wherein appears vertical blanking pulse 95, there being a period of 15,640.625 microseconds corresponding to 500.5 horizontal traces beween each vertical blanking pulse. This provides a 1067 line standard 2:1 interlace raster at a rate of 30 frames per second.

Consider now the operation of the apparatus when the horizontal-vertical switch 33 is in the vertical position. With the Move-Set switch 41 in the MOVE position, the shaft encoder 35 is turned until reference line 27 is at the desired position on the picture tube 19. The shaft encoder may be a single turn reflected binary (Gray Code) encoder whose output is fed to a code converter 103. The output of the code converter is a group of pulses that stores a binary number in vertical storage register 45. The output of register 45 is fed via switch 41 and path 111 to zero point storage register 49 and the output of the latter is fed via AND gate 112 to zero point counter 113. The output of register 45 is also fed via path 115 and AND gate 116 to movable point counter 117. AND gates 112 and 116 are enabled during horizontal blanking periods by HBP pulses received via paths 118 and 75 from generator 25. AND gates 112, 116 prevent registers 45 and 49 from feed numbers to the counters 113, 119 during the active portions of horizontal traces when the counters are counting as will next be described.

Zero point counter 113 and movable point counter 117 and display counter 119 are activated to count by pulses received from AND gates 121, 123 and 125 respectively. All three of these gates receive VHFC pulses via path 127 and through AND gate 129 from the 40 megahertz clock 21 whenever AND gate 129 is also receiving an HBP pulse from inverter 76, as occurs between horizontal blanking pulses during the active portion of each horizontal trace. All three gates 121, 123, 125 have been enabled during the preceding horizontal blanking period by the presetting into the zero and movable point counters 113 and 117 of a number from the shaft encoder, the outputs of counters 113 and 117 being fed to gates 121, 123, 125 over paths 131, 133 and 135 respectively. Paths 131 and 133 include inverters 137, 139. Path 135 includes contact 141 of the MOVE-SET switch 41 and inverter 143 and OR gate 145.

The zero and movable point counters 113 and 117 both recycle when the VHFC pulses added to the counts placed therein by the shaft enoder total zero. Such recycling causes outputs from both counters 113 and 117 via paths 131 and 133 to OR gate 147 to cause a spot modulating pulse to be delivered via path 149 and Black or White switch 44 to mixer 17 to produce a spot for the initial vertical reference line 27 on picture tube 19.

Recycling of movable point counter 117 also shuts off the pulse over path 135 to OR gate 145, thereby turning off display counter 119 which thus displays the position of initial vertical reference line 27 as selected by the shaft encoder. It may be noted that there is no output to OR gate 145 from EXCLUSIVE OR gate 151 during the MOVE mode of operation of the apparatus since gate 151 is receiving like signals from zero and movable point counters 113 and 117.

After recycling, counters 113 and 117 do not continue to receive VHFC counting pulses from AND gate 129 because the recycling disenabled AND gates 121, 123 in addition to disenabling gate 125 for the display counter. However during the next horizontal blanking period counters 113 and 117 are again preset with the number stored in registers 45 and 49 and this reenables gates 121, 123. Upon receiving the prescribed count from gate 129 the counters 113, 117 again recycle to spot modulate the horizontal trace of the picture tube at a point the same difference from the left edge of the screen as the previous spot modulation. Repetition of this procedure for a whole frame produces the initial vertical reference line 27.

If the MOVE-SET switch 41 is now moved to the SET position, the initial vertical reference line 27 continues to be generated by virtue of the number stored in zero point storage register 49; zero-point counter 113 continuing to recycle once each horizontal trace as during the MOVE mode of operation. However by moving the shaft encoder 35 to a new position, a new number is stored in registrer 45 and fed via path 115 to movable point counter 117. Therefore, counter 117 recycles when its input, more or less than required in the MOVE mode, equals the complement of the new number selected by the shaft encoder. Recycling of counter 117 produces spot modulation of each horizontal trace of the picture tube to produce comparison vertical refence line 29, which may be either to the right or the left of initial vertical reference line 27. The signals for the two vertical reference lines pass through OR gate 147 to reach mixer 17.

In the SET mode of operation, OR gate 145 is not enabled via inverter 143 because contact 141 of the MOVE-SET switch is open. However as soon as either of the counters 113, 117 recycles, the resultant output to EXCLUSIVE OR gate 151 via path 153 or 155 produces an output via path 157 to OR gate 145. The output of gate 145 enables display counter 119 which starts counting. Counter 119 continues to count until the other of the two counters 113, 117 recycles, thereby disenabling EXCLUSIVE OR gate 151 and stopping display counter 119. The display counter then contains a stored count proportional to the distance between the two vertical reference lines 27, 29.

Referring now to FIGS. 3 and 4 there is shown an optional modification of the just described gage means for positioning the vertical reference lines. As shown in FIG. 3, a plurality of uniformly spaced scale markings 161 are scribed on the face 163 of camera tube 11 in the position of the first line of its raster. The scale markings 161, are equidistant from their neighbors, and when scanned by the picture tube beam, produce a stream of pulses (SCM) the sum of which count in linearly proportional to the distance scanned by the beam. These pulses form part of the video output of mixer 17 which appears in path 165 (FIG. 1A).

Referring to FIG. 4, the part of the figure below the dashed line represents the apparatus shown in FIGS. 1A, 1B, 1C. According to the modification of FIG. 4, the output of code converter 103, after passing through the Vertical contact means 167 of the horizontal vertical switch 33, does not proceed directly via path 169 to Vertical Input Storage register 45. Instead path 169 is interupted at 171 and the output of shaft encoder 35 is fed through converter 103 and contact means 167 to comparator 173. Comparator 17 also receives the output of auxiliary or "first line" counter 175 which counts the scale marking pulses (SCM) received from video path 165. When comparator 173 finds a match between the number from encoder 35 and the scale marking pulse count, it produces an output via paths 177 and 179 to AND gate 181, thereby allowing the output of auxiliary clock counter 183 (clock counters 113, 117, 119 were previously described) which counts VHFC, the very high frequency pulses of the 40 $MH_z$ clock 21, to be fed to Vertical Input Storage register 45. If there is any non-linearity with time in the horizontal drive ramps within the camera tube such that the count of VHFC is not linearly proportional to distance over the face of the picture tube, such non-linearity is compensated for by the corrector circuit just described.

Still referring to FIG. 4, when the comparator 173 has found a match between the "first line" counter 175 and the number from the shaft encoder, not only is an enabling pulse sent via path 179 to AND gate 181 but reset pulses are sent via paths 180, 182, to the "first line" counter 175 and auxiliary clock counter 183, respectively, preparing them for reoperation at the start of the next frame. A time delay circuit means 184 delays the arrival of the reset pulse between its input at path 182 and its output to path 186 long enough for the output of the auxiliary clock counter 183 to discharge its count via AND gate 181 to Vertical Input Storage 45 upon enabling of AND gate 181. At the same time a reset pulse is sent via path 188 to flip-flop 185, resetting the latter to produce zero output at path 187, thereby disenabling AND gate 189 until the flip-flop is set with a start frame pulse (SFP) from path 81 and HSP is present at the input to AND gate 189, i.e., there is no horizontal start pulse present. As long as AND gate 189 is disenabled, AND gate 191 and 193 are disenabled, so that neither the auxiliary clock counter 183 nor the "first line" counter 175 does any more counting until the start of the next frame.

Referring once more to FIGS. 1A, 1B, and 1C, consider now the operation of the apparatus when the horizontalvertical switch 33 is in the horizontal position. During this time the Vertical Innput Storage register 45 will continue to supply the last previous output of the shaft encoder 35 to the Movable Point Counter 117 to position vertical reference line 29, and zero point Storage register 49 will continue to supply the last previous output of the shaft encoder 35 when the Move Set switch 41 was in the MOVE position to zero point counter 113 to position vertical reference line 27 on picture tube 19.

With switch 33 in the horizontal position and Move Set switch 41 in the Move position, the output of the shaft encoder, as converted by converter 103 to a binary output, is fed via switch contact 201 to horizontal input storage register 47, from which an output is fed via path 202 and Move contact 203 of Move-Set switch 41 to zero point storage register 51.

Register 51 feeds into zero point counter 205 via path 206, AND gate 207, and path 208. The output of converter 103 is also fed via path 210, AND gate 212, and path 214 to movable point counter 209. AND gates 207, 212, also receive pulses during both vertical blanking periods (VBP) via path 216 from OR gate 218, the latter being connected via paths 77 and 79 to receive VBP No. 1 and VBP No. 2 from generator 25. Therefore counters 205, 209 are cut off from registers 47, 51 during periods of no vertical blanking pulse $\overline{VBP}$ and do not interefere with their counting during such periods.

Counters 205 and 209 function much the same as counters 113, 117 of the vertical reference line gage means previously described. However the counters 205, 209 are controlled by a group of logic gates which permit them to count only during the field period ($\overline{VBP}$ No. 1) or ($\overline{VBP}$ No. 2) or "Not Vertical Blanking Period" No. 1 or No. 2) in which the horizontal trace reprsenting the pre-selected or pre-set number from the shaft encoder falls. In the following discussion, all odd numbered lines (traces) are in the first field of each frame and all the even numbered lines are in the second field.

The determination of during which field a counter 205 or 209 is to count the pulses from the high frequency clock (HFC) 23 is controlled by the least significant bit (LSB) of the counter's preset number received from the shaft encoder via one of the storage registers. If the LSB is odd, i.e., the LSB is a "one", the appropriate gates are enabled to permit the counter, 205 or 209, to count only during the first field; if the LSB is even, i.e., the LSB is a "zero", the appropriate gates are enabled to permit the counter, 205 or 209, to count only during the second field.

To effect the foregoing result, counter 205's LSB output is fed via path 211 to AND gate 213 and also, via inverter 215, to AND gate 217. Thus, opposite inputs are supplied to gates 213, 217. Gates 213, 217 respectively, also receive inputs VHP No. 1 and VHP No. 2 from synchronization generator 25 via paths 77, 79. Therefore one or the other of gates 213, 217 has an output depending upon whether the LSB is odd or even and such output occurs during the first field if the LSB is odd and during the second field if the LSB is even. If either of gates 213, 217 is conducting, OR gate 219 has an output. An output from gate 219 enables AND gate 221 to pass HFC pulses from path 73, and same are sent to AND gate 223, previously enabled from counter 205 via path 225, inverter 227 and path 229 by the setting of counter 205. HFC pulses from AND gate 223 are fed to zero point counter 205 via path 231 and to zero point display counter 223 via path 235.

When zero point counter 205 receives enough HFC pulses to recycle, an output pulse is fed via path 236, OR gate 238, path 240, black or white switch 44 and path 242 to mixer 17, thereby to modulate one trace of picture tube 19 and produce the initial horizontal reference line 31.

In like manner, counter 209's LSB output is fed via path 241 to AND gate 243 and, through inverter 245, to AND gate 247. The latter gates also receive VBP No. 1 and No. 2 signals via paths 77 and 79 respectively, whereby gate 247 is conducting during the first field if the LSB is odd and gate 243 is conducting during the second field if the LSB is even. If either of gates 243, 247 has an output, OR gate 249 provides an output signal to enable AND gate 251, whereby the latter can transmit HFC pulses received via paths 73 and 253. The HFC output of AND gate 251 is fed to movable point counter 209 through AND gate 255 which was previously enabled via path 257, inverter 259, and path 261, by the setting of counter 209. The HFC output of AND gate 255 is fed to movable point display counter 263 via path 265.

When movable point counter 209 recycles after receiving sufficient HFC pulses, an output pulse is fed via path 266, OR gate 238, path 240, black or white switch 44, and path 242 to mixer 17, thereby to modulate another trace of picture tube 19 and produce the second horizontal reference line 33. Reference line 31 continues to be produced by pulses from counter 205 via path 236.

The two display counters 233, 263 acquire the same counts as the gage means counters 205, 209; however they count from zero and are rest at the start of each frame, e.g. by a start frame pulse (SFP) received over a suitable path (not shown) from generator 25.

In the Move mode of operation of the system both display counters 205, 209 acquire the same count; hence it is only necessary to display either one. In the Set mode of operation, the distance between the two horizontal reference lines is proportional to the numerical difference between the counts accumulated in the two display counters, and it is necessary to first determine which of the display counters 205, 207 has the larger number and then subtract the produce number from the larger to producue the number indicating the distance between the horizontal reference lines. To achieve the foregoing results computer means is provided.

The computer means includes comparator 271 which compares the two ten bit binary numbers received from display counters 233, 263 and generates a pulse at one of three outputs according to whether the count Z in the zero pointer counter 233 is less than, equal to, or greater than the count M in the movement point counter 263. The computer means further includes Exclusive OR gates 273, 275, inverter 277, AND gate 279, and full adder 281.

If Z equals M as in the Move mode of operation, the $Z=M$ output of the comparator is inverted at 277, thereby disenabling AND gate 279. The number in movable point display counter 263 then passes through Exclusive OR gate 295 to the full adder 281 via path 283. Since AND gate 279 is disenabled, no other number enters the adder via path 285, whereby the adder output via path 287 equals the number in the movable point display counter.

If Z is not equal to M, as in the Set mode of operation, the smaller number is negated ("1"s changed to "0"s and vice versa) by action of exclusive OR gate 273 or 295 and then added to the larger number in adder 281, thereby effecting a subtraction so that the adder output via path 287 represents the difference between the counts in the zero point and movable point display counters 233 and 263.

In regard to the foregoing note that if M is less than Z, then AND gate 279 is enabled by Z equals M path 291 and inverter 277, and Exclusive OR gate 273 is not excited via path 293, whereby the count in zero point display counter 233 passes through gates 273 and 279 and enters adder 281 via path 285. At the same time the M is less than Z output via path 294 excites exclusive or gate 295 so that the output of counter 263, negated by gate 295 is fed to the full adder via path 283. On the other hand if Z is greater than M, exclusive OR gate 295 is not excited and counter 263 feeds its non-negated output to the full adder 281 via Exclusive OR gate 295. At the samme time Exclusive OR gate 273 is excited and adder 281 receives the output of counter 233 and negated by gate 273 via AND gate 279 and path 285.

The output of the full adder 281 via path 287, which is a measure of the vertical distance between the horizontal reference lines, and the output of display counter 119, which is a measure of the horizontal distance between the vertical reference lines, fed via path 303, proceed respectively to contacts 305, 307 of horizontal-vertical switch 33, and according to the position of the switch 33, one or the other of the output is fed through scaling means 309 and converter 311 to one or the other of contacts 313, 315, and finally, according to the position of switch 33, through one or the other of display storage registers 317, 319, to one or the other of visual displays 321, 323. It is to be noted that when the switch 33 is in the Vertical position to enable the encoder 35 to control the position of the vertical reference lines 27, 29, visual display 321 receives data indications of the horizontal distance between lines 27, 29. When switch 33 is in the Horizontal position to enable encoder 33 to control the position of the horizontal reference lines 31, 33, visual display 323 receives data indicative of the vertical distance between lines 31, 33, but visual display 321 continues to display the previously determined horizontal distance between vertical lines 27, 29, as registered in horizontal storage register 317. If switch 33 is returned to the vertical position to send data to visual display 321, visual display 323 continues to display the previously determined vertical distance between horizontal reference lines 31, 33.

Scaling means 309 includes a multiplying means 325 receiving to multiplicand from counter 19 or adder 281 via contact 307 or 305 respectively of switch 33, and path 327. Multiplying means 325 receives its multiplier from a decade switch means 329 comprising three manually set switches whose binary coded decimal output is converted to binary by converter 331. The multiplying means enables the visual displays 321, 323 to be presented in conventional units, e.g. thousanadths or millionths of an inch, depending on the magnification of the lens system 15.

For example, in most one inch television camera tubes the horizontal distance scanned by the vidicon's electron beam is 0.5 inches. If the multiplier is set at unity, each count of the reading on horizontal distance visual display 321 represents one thousandths of this distance of 0.0005 inches. If the magnification produced by lens system 15 is 500X, the visual display 321 reads in microinches. A magnification of 125X would produce a readout in microns, and a 1000X magnification provides a display output reading in units of a half-millionth of an inch. If the magnification is not precisely 500X or 125X, or 1000X, the multiplier can be set to cause the visual display to readout in precisely the desired units. The magnification should be adjusted to be slightly on the high side so that the multiplier, a decimal fraction, can reduce the readings to the deisred units.

To calibrate the system, a measurement is made with an object of known dimensions. Calibration of the system in either the horizontal or vertical direction will effect calibration in the other direction as well, for a common oscillator, and 40 $MH_z$ clock 21 is the ultimate source of both the 1000 line raster of horizontal traces, which lines are counted to measure vertical distances, and the VHFC pulses (1/40 or 0.025 micro second pulse rate period) which divide the 25 micro second active time of each horizontal trace into 1000 parts.

Figure 6:
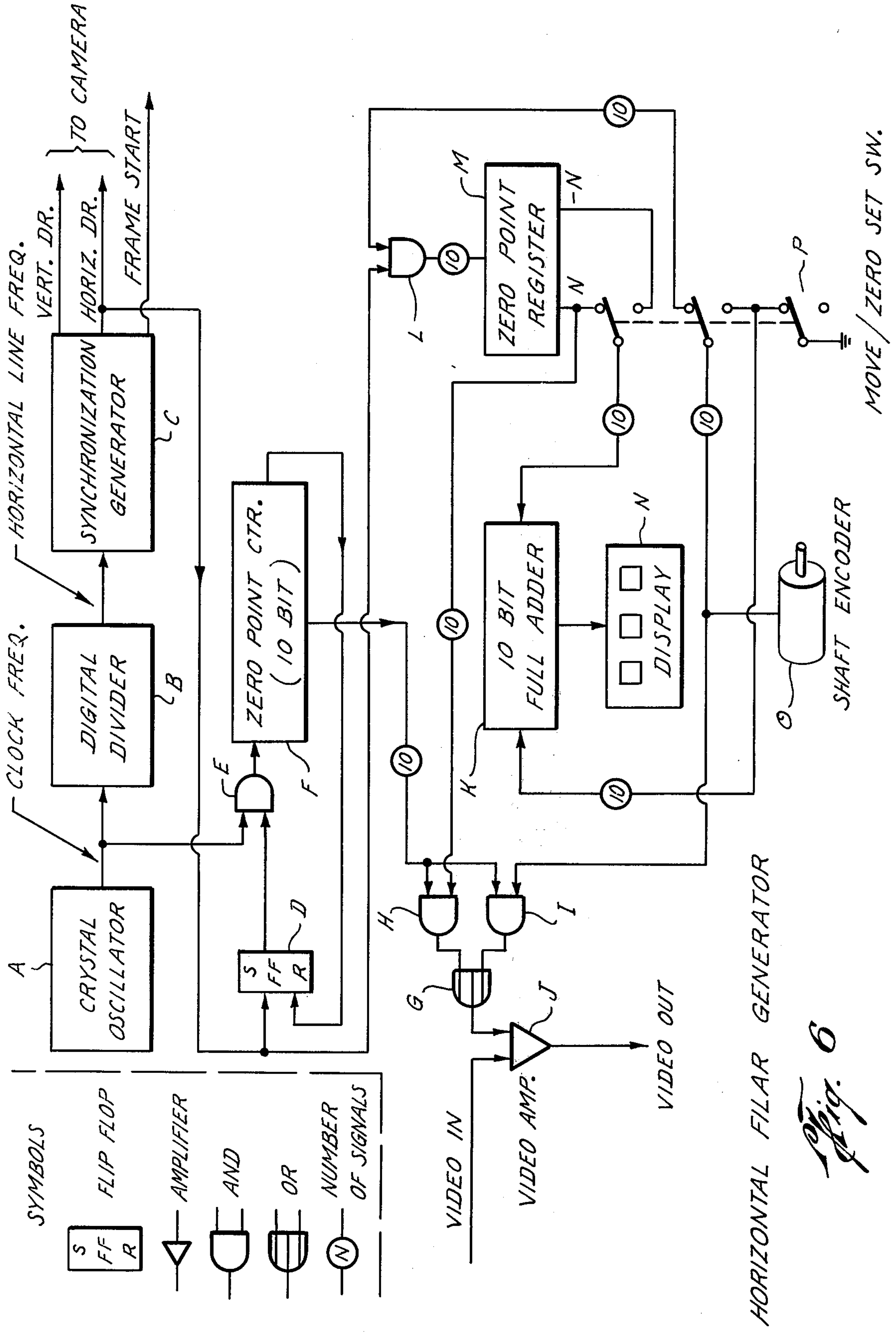
FIGS. 6, 7 and 8 are block and logic diagrams showing a modified form of measuring system in accordance with an earlier form of this invention.
Figure 7:
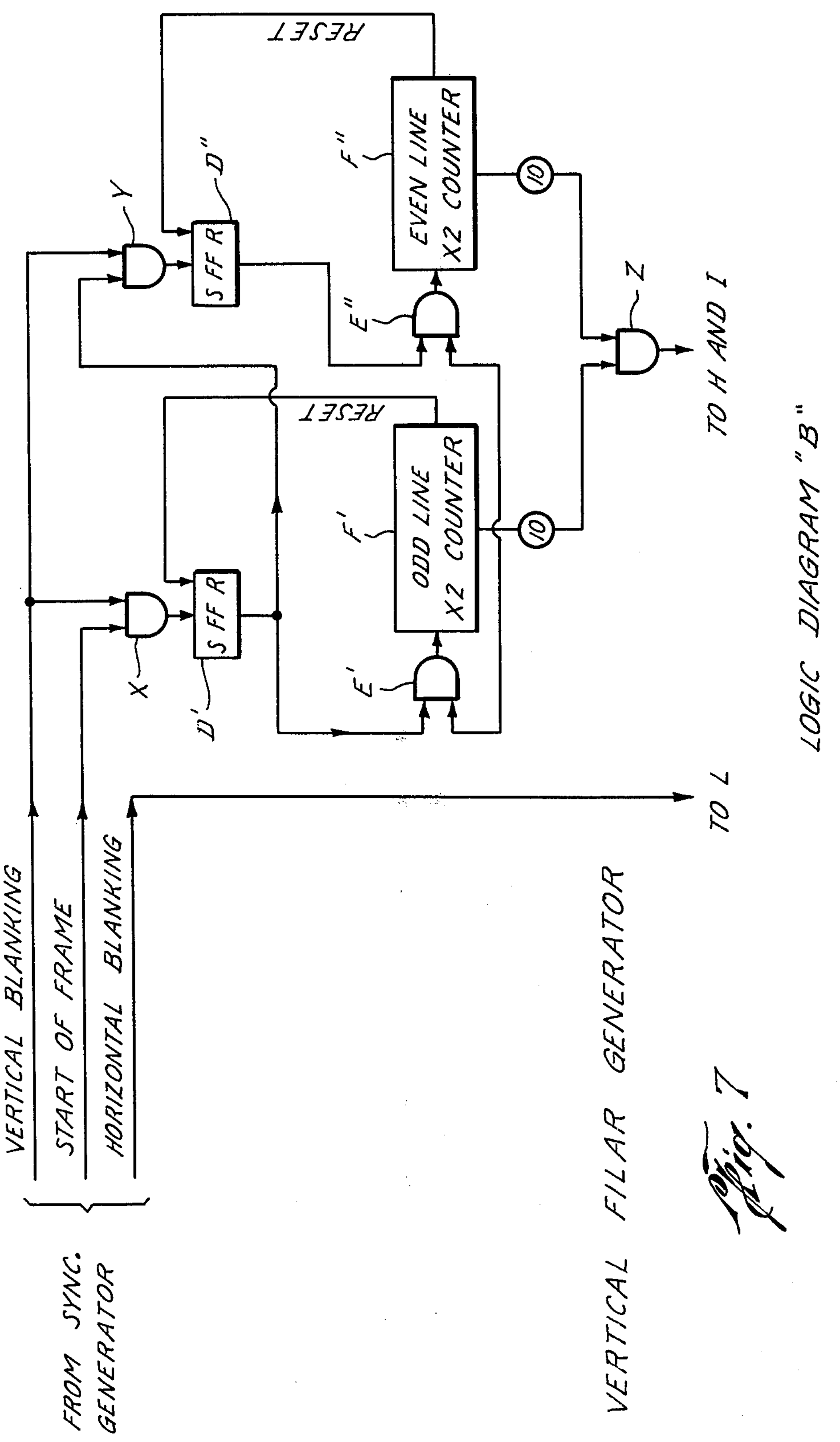
Figure 8:
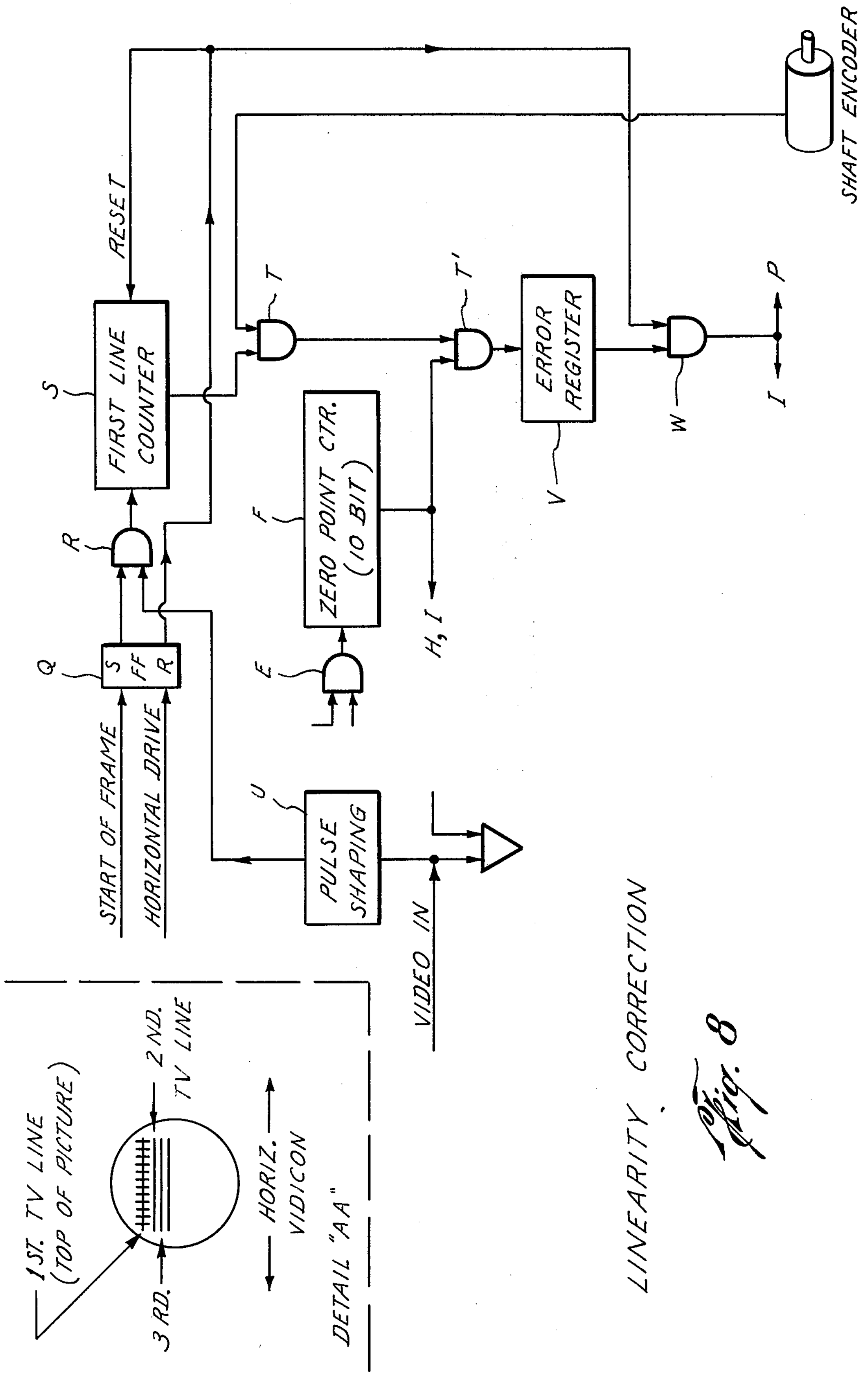

Referring now to FIGS. 6, 7, and 8 there is shown a modified form of the invention. From the description of the preceding embodiment it will be apparent that the designation of position of the horizontal/vertical switch as being in the horizontal or vertical position is somewhat ambiguous because when the switch is in one position the shaft encoder controls the location of the horizontal reference lines and the associated visual display measures vertical distance, whereas when the switch is in the other position the shaft encoder controls the location of the vertical reference lines and the associated visual display measures horizontal distance. To eliminate this difficulty, in the following description the vertical reference lines will be termed horizontal filars, meaning lines from which horizontal distances are measured, and the horizontal reference lines will be termed vertical filars, meaning lines from which vertical distances are measured.

Referring first to FIG. 6, the horizontal filar generator, the system works as follows:

The system works in two modes. The modes are selected by Switch (P) which is shown in the first mode position.

In Mode I, there is one filar line on the TV monitor. The position of the filar is determined relative to the left edge of the picture or the start of each horizontal line period (active period).

In Mode II there are two filar lines on the monitor. One is fixed at a point determined by Mode I. The second is movable in either direction from the fixed filar by Shaft Encoder (0). The numerical display indicates in arbitrary units the distance single filar is from the left edge of the TV picture is Mode I and the distance between two filars in Mode II.

The system can be made to work with a television system having any number of horizontal lines. The change required from one TV format to another is the frequency of the Crystal Oscillator (A) and the size of the counters and registers in the system the details of such required changes being apparent to one skilled in the art. The system described provides a thousand measurement units in each axis.

The Digital Divider (B) divides the clock frequency down to the twice horizontal line frequency. This in turn, drives synchronization generation circuitry which develops horizontal and vertical drive commands for the TV camera. The Sync. Generator (C) also puts out a discrete pulse indicating the start of a TV frame.

In operation, and on the occurence of any Horizontal Drive Pulse, Flip-Flop (D) is set and enables AND gate (E). This action permits the Zero Point Counter (F) to start counting the Clock Frequency. (In this example the Crystal Oscillator (A) frequently was chosen to generate 1000 pulses in the active horizontal line period of the TV system.)

This same pulse enables AND gate (L) which establishes in the Zero Point Register (M) a number from Shaft Encoder (0). The output of (F) is continuously compared with the number in (M) through AND gate (H) as well as with the Shaft Encoder (0) directly thru AND gate (I). A Full Adder (K) driving a Digital Display (N) adds the number in (M) to zero which is the number in (M) as well as the number from (0). This is displayed. When the number in (F) agrees with the number in (M) and/or (0), a signal is passed thru both (H) and (I), on thru (G) to the Video Amplifier (J) where the video signal from the camera is modulated with either a white or black (selectable) video pulse.

The counter (F) continues to count until the number 1000 is reached where-upon the counter recycles and resets (D). The next horizontal drives pulse starts the sequence all over again.

In Mode II, the Switch (P) is in the position other than that shown. The operation of (A), (B), (C), (D), (E), and (F) are the same as in Mode I. AND gate (L) is not enabled as the conditions for the gate are not satisfied. Hence, the number set in (M) in Mode I is retained. A video signal is generated thru (H), (G), and (J) every horizontal line period thus forming the fixed or zero point filar.

The movable filar in Mode II is generated by comparing the output of (F) with (0) thru (I) and (G). The output of (K) is now the negative value of the number in (M) added to the number from the Shaft Encoder (0). As there is no sign symbol, (N) displays the numerical difference between (M) and (0).

The logic diagram of FIG. 7 portrays the operation of the vertical filar generator. Most of the circuitry is identical to the horizontal filar generator except that it operates at the TV systems' frame rate instead of its' line rate. The operation is as follows:

A vertical blanking pulse is coincidence with a discrete "start-of-frame" pulse from the Synchronization Generator sets Flip-Flop (D') thru AND gate (X). This enables AND gate (E') and permits Counter (F') to count horizontal blanking pulses (representing the start of each line) of the first field. The counter counts by 2s' and generates the numbers 1, 3, 5 - - - 997, and 999. AND gate (Y) has also been enabled by (D') and on occurrence of the next vertical blanking pulse signifying the start of the second field Flip-Flop (D'') is set and Counter (F'') counts the lines in the second field and generates the numbers 2, 4, 6 - - - 998, and 1000. Flip-Flops (D') and (D'') are reset by the cycling of the respective counters. The number of the two counters are combined thru OR gate (Z) and compared with numbers from the filar positioning logic which is identical from this point on to that described in FIG. 6.

The video amplifier functions the same way except that it now modulates the entire active horizontal line period instead of introducing a discrete pulse into one line as in the case of the horizontall filar. The result, of course, is the presentation on the TV monitor of an all white or black horizontal line whose position is determined by the shaft encoder. Mode II operation for the vertical case is also as previously described.

Referring now to FIG. 8 there is shown a linearity correction system for the measuring system of FIGS. 6 and 7. The linearity correction scheme applies only to the horizontal axis of the TV system. Any non-linearity in the vertical sweep introduces the same distortion into filar positioning as it does to the optical image being scanned. Hence, the errors compensate for one another.

Referring now to FIG. 8 and Detail "AA" thereon, we cause to be introduced into the photo-sensitive surface of the vidicon a series of equally spaced markings. The markings may either be a physical part of the vidicon or they may be optically projected onto the face of the vidicon. The length of the markings need only be long enough so as to be intercepted or scanned by the first horizontal scan of the vidicon's electron beam at the start of a TV frame. The number of lines or marks is related to the resolution of the measuring system and for this discussion consider one thousand marks to be positioned as shown in Detail "AA".

The marks being so arranged, the vidicon' target signal for the first line in any TV frame will consist of 1000 pulses equally spaced in time if the sweep is linear, unequally spaced in time if the sweep is non-linear. So far, this is the same as was described in connection with FIG. 3.

The pulses are squared-up in Pulse Shaping circuit (U) and introduced to AND Gate (R). AND GAte (R) is enabled at the start of each frame by Flip-Flop (Q) permitting Counter (S) to count the pulses. At the same time, the original Zero Point counter (F) is enabled and starts to count the local clock frequency as previously described. If the sweep is linear the count in both counters is identical (except for phase). If the sweep is non-linear, one counter will be ahead of the other. The first line count is compared with the number from the Shaft Encoder (0) thru AND Gate (T). When coincidence is achieved, the count that has accumulated in the Zero Point counter (F) is set (stored) in Error Register (V). At the end of the first horizontal line period the First Line counter is inhibited and the system functions as previously described with the Error Register (V) taking the place of the Shaft Encoder (0).

In both of the above described embodiments of the invention, the system is in a format compatible, from the camera standpoint, with an industry standard, EIA (Electronics Industries Association) RS-343-A.

The elements of the logic circuits and block diagram components shown in the several figures of the drawings may be of conventiona, or any suitable type. A few details, relative to the interior operation of the multiplying means are worthy of mention.

For example, during the horizontal blanking period of the Horizontal Blanking Pulse (HBP), a period of time 6.25 microseconds long (horizontal line time of 31.25 less active line time of 25) the following events take place.

a. Data in the display counter is stored in a register associated with that counter (hitherto not mentioned)

b. The multiplier, which works in a sequential mode, starts to multiply the number in the aforementioned register by the programmed scale factor. There are fifty sequential steps involving five different clock signals and requiring an elapsed time of approximately 3 micro seconds.

c. Shortly after the multiplier starts the display counter is reset for the next count.

d. At about the same time the two point counters which have now recycled and in so doing, generated the filar signals, are preset with a new number from their programming source (i.e. Zero Point Storage and/or Input Storage).

e. Following completion of the multilication cycle the Display Storage is updated with new data from the Binary/BCD converter. This data is held for display until the next blanking period.

All of the above takes place in the few millionths of a second that the TV camera's vidicon takes to return from the end of one horizontal line to start scanning the next line. A similar sequence of events takes place during the vertical blanking period.

A word about some of the components may also be of help. In the examples the full count on each counter is 1024 or 2 to the tenth power requiring ten bits for each counter. All of the counters count up except for the two counters 175, 183 of the linearity correction means of FIG. 4. When a counter is reset to zero or preset to a number less than its maximum count capability, the counter's output is logic "0". It changes to a logic "1" when the counter reaches full count and recycles.

The registers which store the various numbers which are supplied by the shaft encoder or derived from the counters each consist of ten Flip-Flops capable of storing any count up to 1024.

The shaft encoder is a device to convert shaft angle, as determined manually by the operator turning the control knob 37, into a set of two level signals, logic levels "0" and "1", that represents the digits in a number. Preferably the shaft encoder is of the one turn mechanical contacting type employing a plurality of brushes (see U.S. Pat. No. 3188407), one for each digit, cooperating with an equal number of concentric conducting tracks, each track being divided into a number of segments equal to "2" raised to the power of the number of the track counting from the inside out. There are as many parallel line leads leading from the encoder disc as there are track segments in order to provide a simultaneous output. A single turn suffices to produce all of the 1024 numbers (0 to 1023) which the encoder can put out. To reduce ambiguity in the output due to brush width, the encoder produces a reflected binary or Gray Code output whereby only one digit at a time changes, the possible error thereby being reduced to one. The encoder is of the "absolute" type as defined in the booklet "Norden Encoders" dated 1971 put out by Norden Division of United Aircraft Corporation, such absolute type being one in which the encoder delivers a complete word defining the location of the least bit sensed, i.e. the absolute shaft angle within the span of the least significant bit. A Norden Model Number ADC-ST10 Gray is suitable.

An embodiment of the subject invention was, it is believed, completed in about 1971 and embodiments of the measuring system have been mentioned in the December 1971 issue of Industrial Research, the May 1972 issue of Research and Development, and the July 1972 issue of Electro Optical Design to the extent indicated on one of the following pages after the Norden Gray Code Encoder leaflet. The first sale of an embodiment of the invention was in 1972.

The operation of the subject system is explained in easy to understand terms in a pamphlet by Pulse Systems Incorporated, appearing hereinafter following the above mentioned magazine publications.

Although two preferred embodiments of the invention have been shown and described, many modifications thereof can be made by one skilled in the art without departing from the spirit of the invention.

I claim:

1. Measuring apparatus comprising a closed circuit television for viewing an object with a television camera and producing its image on a television screen, gage means for producing at least one adjustable position reference line on the screen, said gage means comprising:

counte means for counting a number of pulses, encoder means for selectively entering and storing a reference number, means connecting said encoder means to said counter means, pulse stream generating means, synchronizer means coupling the output to said generating means to said counter means at at least on predetermined time during each television screen frame, modulator means to produce a first reference mark on the television screen at said predetermined time, and a second reference mark each time the number of pulses from said generating means fed to said counter means compares with the number selected with the encoder means, whereby the distance on said screen between said first and second reference marks is a direct function of the number selected with the encoder means.

2. Apparatus according to claim 1, said gage means producing first and second parallel vertical reference lines and first and second parallel horizontal reference lines, said counter means including two pairs of counters, one paair for the horizontal reference lines and one pair for the vertical reference lines, each pair including a zero point counter and a movable point counter, said connector means including horizontal-vertical switch means for selectively connecting said encoder means to one or other of said pairs of counters and move-set switch means for each of said pairs for selectively connecting one of said counters of said one pair to said encoder means, each of said pairs of counters including storage means for holding a number received by the zero point counter from said encoder means even after said move-set switch means disconnects said encoder therefrom, said connecting means including storage means between said horizontal-vertical switch means and said move-set switch means in each path between said encoder means and the respective pairs of counter means for holding a number received from the encoder means by each of said pairs of counters even after said horizontal-vertical switch means disconnects said encoder therefrom.

3. Apparatus according to claim 1 wherein said synchronizer means couples the output of the pulse stream generator to the counter means at the beginning of each field of the television raster and the pulse stream generator produces a plural number of pulses during each field.

4. Apparatus according to claim 3 wherein said television employs a standard 2:1 interlace and the output of the pulse stream generating means is fed to said counter means at the line frequency rate and said counter means includes an odd trace counter and an even trace counter each counting by twos and means to combine the output thereof for comparison with the output of said encoder means, said synchronization generator including means to couple said odd trace counter to said pulse stream generator at the beginning of the first trace and means to couple said even line counter to said pulse stream at the beginning of the second trace.

5. Apparatus according to claim 1 wherein said synchronizer means couples the output of the pulse stream generator means to the counter mens at the beginning of each trace of the television raster and the pulse stream generator produces a plural number of pulses during the active time of each trace.

6. Apparatus according to claim 5 wherein said number of pulses equals the number of active traces in the television raster.

7. Apparatus according to claim 5 wherein the pulse stream generator is synchronized with the television horizontal sync pulses.

8. Apparatus according to claim 1 said counter means counting from zero during each counting period, said modulator means acting when the count in said counter means equals that of said encoder means.

9. Apparatus according to claim 8, said gage means producing two parallel reference lines, said encoder including move-set switch means and zero point storage means and shaft encoder means, said storage means lying between said shaft encoder means and counter means in the move position of said switch means to continue to supply an initial output of the shaft encoder to said counter means even after said move-set switch has been moved to the set position disconnecting said encoder from said counter means, said modulator means comparing the count of said counter means with both said register and said shaft encoder when said switch is in the set position to produce said two reference lines.

10. Apparatus according to claim 1, said gage means producing first and second reference lines, said encoder means including move-set switch means and storage means and shaft encoder means, said storage means lying between said shaft encoder means and counter means in the move position of said switch means to continue to supply an initial output of the shaft encoder means to said counter means even after said move-set switch has been moved to the set position and said shaft encoder means is connected to said counter means to feed another number thereto.

11. Apparatus according to claim 10, including display means to indicate the distance between said first and second reference lines.

12. Apparatus according to claim 1, said gage means producing first and second reference lines, said counter means including first and second counter means, said connection means selectively connecting said encoder means to one of said first and second counter means, at least one of said first and second counter means including storage means connected to its input for holding a number received from said encoder means even after said encoder means is disconnected from said one counter means.

13. Apparatus according to claim 12 wherein one of said reference lines is horizontal and one is vertical.

14. Apparatus according to claim 12 wherein both of said counter means include such a storage means.

15. Apparatus according to claim 12 wherein said reference lines are parallel and said counter means includes display counter means and control means to start said display counter means when one of said counter means has received a number of pulses equal to that in said storage register and to discontinue the count of said display counter means when the other of said counter means has received a number of pulses equal to the number from said encoder means, the number in said display counter being a measure of the distance between said two reference lines.

16. Apparatus according to claim 12 wherein said reference lines are parallel and said counter means also includes a pair of display counter means and control means to start display counter means when said first and second counter means start counting, and to terminate counting by one and the other of said display counter means when one and the other respectively of said first and second counter means have received a number of pulses indicative of said desired reference line position and means to determine the difference in the counts of said display counters, the difference being a measure of the distance between said two reference lines.

17. Apparatus according to claim 12, said storage means and encoder means setting said first and second counter means to count from the numbers in said storage means and from said encoder means respectively.

18. Apparatus according to claim 12 wherein said reference lines are parallel.

19. Apparatus according to claim 18 wherein said reference lines are vertical.

20. Apparatus according to claim 18 wherein said reference lines are horizontal.

21. Apparatus according to claim 1, said gage means producing first and second reference lines, said apparatus including display means indicating a measure of the distance between said reference lines.

22. Apparatus according to claim 21 said display means including multiplying means to scale the display means output.

23. Apparatus according to claim 22 said apparatus including lens means to magnify the scene viewed by the television camera, said multiplying means enabling compensation for deviation of said lens means from particular degrees of magnification to produce display means readings in standard units.

24. In measuring apparatus having a closed circuit television for viewing an object with a television camera and producing its image on a television screen, gage means for producing at least one adjustable position reference line on the screen, said gage means having:

encoder means, counter means, means for selectively entering a number indicative of a desired reference line position into said encoder means, means connecting said encoder means to said counter means, in such manner as to provide a count in the counter means which is indicative of said desired reference line position, pulse stream generating means, synchronizer means coupling the output of the pulse stream generator to the counter means at the beginning of each field of the television raster and the pulse stream generator a plural number of pulses during each field, modulator means operable to produce a reference mark on the television screen in response to comparison of the counted generator means pulses with the count in the counter means indicative of said desired reference line position;

the improvement wherein:

the output of said pulse generating means is fed to said counter means at twice the line frequency rate and said synchronization means includes means responsive to the least significant bit supplied by said encoder means to start the counter means counting at the beginning of the first or second field of the television raster according to whether said bit is odd or even.

25. In measuring apparatus having a closed circuit television for viewing an object with a television camera and producing its image on a television screen, gage means for producing at least one adjustable position reference line on the screen, said gage means having, counter means, encoder means, means for selectively entering a number indicative of a desired reference line position into said encoder means, means connecting said encoder means to said counter means, in such manner as to provide a count in the counter means which is indicative of said desired reference line position, pulse stream generating means synchronized with the television horizontal sync pulses, synchronizer means for coupling the output of said pulse stream generator means to the counter means at the beginning of each trace of the television raster and the pulse stream generator produces a plural number of pulses during the active time of each trace, modulator means operable to produce a reference mark on the television screen in response to comparison of the counted generator means pulses with the count in the counter means indicative of said desired reference line position;

the improvement wherein:

the television camera has a series of uniformly spaced scale markings across its face along the path of the first trace, and said encoder means includes shaft encoder means and register means, said apparatus further comprising:

first line counter means to count pulses produced by the camera tube's beam sweeping said markings, and means to compare the number in the first line counter means with the number entered into the encoder means register and, when a match is achieved, to store a count equal to the count then existing in the first said counter means.

26. Measuring apparatus comprising a closed circuit television for viewing an object with a television camera and producing its image on a television screen, gage means for producing first and second reference lines on said screen, said gage means comprising:

first and second counter means, encoder means including means to supply a number signal to said second counter means, means for selectively entering a number indicative of a desired reference line position into said encoder means, means connecting said encoder means to said counter means, in such manner as to provide a count in the counter means which is indicative of said desired reference line position, first pulse stream generating means for producing a pulse stream having a pulse repetition rate equal to the line frequency rate multiplied by the interlace number, second pulse stream generating means for producing a pulse stream having a pulse repetition rate that is greater than the line frequency, synchronizer means coupling output of said first and said generating means to said first and second counter means respectively at at least one predetermined time during each television screen frame, and modulator means operable to produce a reference mark on the television screen in response to comparison of the counted generator means pulses with the count in its associated counter means indicative of said desired reference line position.

27. Means for correcting for time non-linearity in the horizontal sweep of a camera tube raster comprising a series of uniformly spaced markings across the face of the tube along the path of the first trace, clock means for producing a stream of pulses uniformly spaced in time, a main counter means to count pulses from said clock, first line counter means to count pulses produced by the camera tube beam sweeping said markings, and means including a register to compare the number in said first line counter means with a preselected number and when a match is obtained to store in the register the count then existing in said main counter means to be used in place of said preselected number for determining action dependent upon the occurrence of a desired distance of travel of said horizontal sweep as measured by counting said clock pulses.

* * * * *